United States Patent
Charron

(10) Patent No.: US 6,732,766 B2
(45) Date of Patent: May 11, 2004

(54) PIPE COMPRISING A POROUS INNER WALL

(75) Inventor: Yves Charron, Longpont sur Orge (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 10/389,768

(22) Filed: Mar. 18, 2003

(65) Prior Publication Data

US 2003/0178084 A1 Sep. 25, 2003

(30) Foreign Application Priority Data

Mar. 21, 2002 (FR) .......................................... 02 03510

(51) Int. Cl.⁷ ................ F16L 9/14; F17D 1/02
(52) U.S. Cl. ................ 138/177; 138/178; 138/DIG. 9; 137/13
(58) Field of Search ................ 138/177, 178, 138/149, 175, DIG. 9, 38; 137/13

(56) References Cited

U.S. PATENT DOCUMENTS

| | | | |
|---|---|---|---|
| 2,899,150 A | * 8/1959 | Ellis | 244/200 |
| 3,040,760 A | 6/1962 | Macks | 137/13 |
| 3,182,674 A | * 5/1965 | Burke | 137/814 |
| 3,273,599 A | * 9/1966 | Heeren | 138/38 |
| 3,307,567 A | 3/1967 | Gogarty, et al. | 137/13 |
| 3,464,740 A | * 9/1969 | McIver | 406/191 |
| 3,568,723 A | * 3/1971 | Sowards | 138/143 |
| 4,044,797 A | * 8/1977 | Fujie et al. | 138/38 |
| 4,248,179 A | * 2/1981 | Bonner | 122/235.14 |
| 4,402,359 A | * 9/1983 | Carnavos et al. | 165/70 |
| 4,759,516 A | 7/1988 | Grose | 244/130 |
| 5,896,896 A | * 4/1999 | Rojey | 138/177 |

FOREIGN PATENT DOCUMENTS

FR 2 755 745 11/1996 ............. F17D/1/02

* cited by examiner

*Primary Examiner*—Patrick Brinson
(74) *Attorney, Agent, or Firm*—Antonelli, Terry, Stout & Kraus, LLP

(57) ABSTRACT

Pipe (1) for conveying a fluid. It comprises a metal tube (2). The inner wall of the metal tube is coated with a layer (3) of a porous material permeable to the fluid conveyed. The fluid circulates in layer (3) in order to limit the pressure drops generated by the flow.

24 Claims, 1 Drawing Sheet

PIPE COMPRISING A POROUS INNER WALL

FIELD OF THE INVENTION

The present invention relates to the sphere of reduction of the pressure drops of a fluid circulating in a pipe.

BACKGROUND OF THE INVENTION

Document WO-84/03,867 is aimed to reduce the drag forces generated by the relative velocity of a fluid on an object by providing the surface of the object with grooves. French patent applications No. 02/02,598 and No. 02/02,599 present a method of manufacturing grooves on the inner surface of a pipe.

The petroleum industry uses pipes, commonly called <<pipelines>> or <<gas pipelines>>, for conveying gas or petroleum effluents over long distances. In order to reduce the number of recompression stations placed along these pipes, it is interesting to be able to reduce the pressure drops generated as the fluid flows through these pipes.

There are also pipes whose walls are deformable in order to reduce the pressure drops generated by the fluid flow. The deformable walls are provided with active systems (exciting systems) or passive systems.

SUMMARY OF THE INVENTION

The present invention provides another technique for reducing the pressure drops generated as a fluid flows through a pipe. It provides passive control of the flow by coating the inner wall of the pipe with a layer of a porous and permeable material.

In general terms, the invention relates to a method for decreasing the pressure drops generated by the flow of a fluid in a tube, the method comprising the following stages:

putting a layer of a porous material onto the inner surface of the tube impermeable to the fluid, and selecting the material having a permeability which is such that said fluid circulates in said layer.

According to the invention, at least one of the characteristics of said material layer can be determined so as to reduce the pressure drops generated by the fluid flow in the pipe, the characteristics being the porosity of the material, the permeability of the material and the thickness of the layer. The porosity of the material can range between 1% and 50%, preferably between 5% and 35%. The permeability of the material can range between 0.005 D and 5 D, preferably between 0.1 D and 1 D. The thickness of the layer can be determined according to the viscous layer of the fluid flow.

The invention also relates to a pipe for conveying a fluid. The pipe comprises a tube impermeable to the fluid conveyed and a layer of a porous material covering the inner wall of the tube. The permeability of the material is such that the fluid circulates in the layer.

According to the invention, the porosity of the material can range between 1% and 50%, preferably between 5% and 35%. The permeability of the material can range between 0.005 D and 5 D, preferably between 0.1 D and 1 D. The thickness of the layer can be greater than the thickness of the viscous layer generated by the fluid flow on the porous and permeable material. The layer of porous and permeable material can comprise grooves arranged in the direction of flow of said fluid and/or the layer of porous and permeable material can be deformable.

The method and/or the pipe according to the invention can be used for natural gas transportation.

The invention allows passive control of the flow of a fluid in a pipe, i.e. the invention requires no exciting systems, instruments or exterior energy supply for producing a pressure drop reduction. It allows to reduce by up to 30% the value of the pressure drops of a fluid on turbulent flow in a pipe. The presence of a layer of a porous and permeable material on the inner wall of the pipe creates a buffer zone which changes the characteristics of the flow in the vicinity of the wall. In particular, the viscous layer allows a velocity increase in the vicinity of the porous wall without any pressure drop increase. Furthermore, the layer of permeable and porous material allows the transition from a laminar flow to a turbulent flow to be delayed. Besides, the invention allows the swirling-flow mechanisms in the viscous layer to be controlled.

BRIEF DESCRIPTION OF THE DRAWINGS

Other features and advantages of the invention will be clear from reading the description hereafter, with reference to the accompanying drawings wherein.

DETAILED DESCRIPTION

Figure 1:
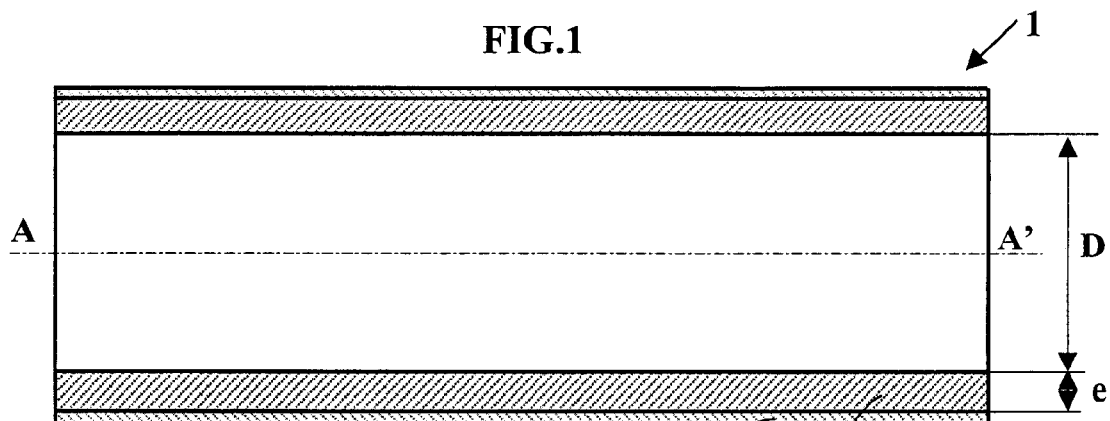
FIG. 1 shows a pipe.

FIG. 1 shows a pipe 1 of axis AA' consisting of a metal tube 2, for example, of cylindrical shape and of inside diameter D. The dimensions of tube 2 and the metal used for manufacturing tube 2 are selected in such a way that pipe 1 withstands, both mechanically and chemically, the stresses applied thereto. In particular, tube 2 is impermeable to the fluid conveyed and it withstands the effects of the internal pressure. The inner wall of the metal tube is coated with a layer 3. For example, tube 2 is made of steel. Layer 3 can have an annular shape. The material used for layer 3 is porous and permeable.

Pipe 1 allows to convey a gaseous or liquid fluid, a petroleum effluent or gas for example. The fluid conveyed by pipe 1 circulates in all of the inner space defined by tube 2, i.e. the fluid circulates in the material of layer 3 and in the inner space defined by layer 3. The function of the fluid flow in layer 3 is to change the flow of the fluid on the wall of the permeable and porous material layer so as to reduce the pressure drops.

Figure 2:
FIG. 2 shows a numerical simulation of the flow of a fluid in a pipe.

Numerical simulations have been carried out with a direct turbulence simulation code to show the interest of the presence of a layer of a porous and permeable material in a pipe. The simulations relate to a 1-m diameter and 4-m long tube. At the tube inlet, the fluid flow is characterized by the Reynolds number Re=50000. A first simulation is performed on a smooth tube. A second simulation is carried out on a tube whose inner wall is coated with a 0.02-m thick (2% of the diameter) layer of a porous (10% porosity) and permeable material. FIG. 2 shows a simulation result for a fluid flow in tube 11. Arrow 10 shows the direction of flow. The purpose of the simulations is to calculate the enstrophy as a function of time for a smooth walled tube and for a tube coated with a layer of a porous and permeable material. The enstrophy measures the turbulent energy dissipation of a fluid flowing in a pipe. The enstrophy is the integration on a volume of the norm of the vorticity, the vorticity being the rotational vector of the velocity of the fluid in this volume.

Figure 3:
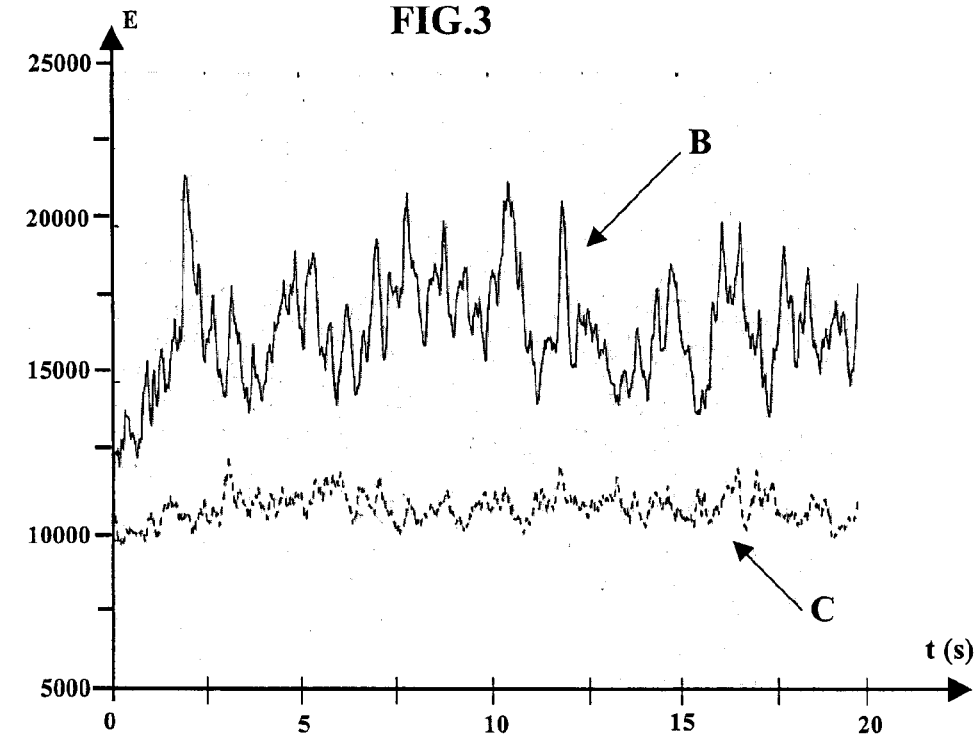
FIG. 3 is a diagram showing the enstrophy of a fluid flowing through a porous walled tube and through a smooth walled tube.

The diagram of FIG. 3 shows the numerical simulation results. The abscissa axis t(s) (graduated from 0 to 20 seconds) represents the time axis, the ordinate axis E (graduated from 5000 to 25000) represents the enstrophy axis. Curve B in full line represents the enstrophy as a function of time, calculated for a smooth walled tube. Curve C in dotted line represents the enstrophy as a function of time, calculated for a tube coated with a layer of a porous and permeable material. It can be observed that the enstrophy, i.e. the turbulent energy dissipation, is 30% lower in the case of a tube coated with a layer of a porous and permeable material in relation to the case of a smooth walled tube. The circulation of the fluid in the porous and permeable material layer therefore reduces the pressure drops of the flow in the pipe.

The porosity and the permeability are two independent characteristics of a material.

A porous material consists of a solid comprising spaces referred to as <<pores>> or <<voids>>. For a sample of a porous material of total volume Vt comprising a total pore volume Vp, the porosity $\phi$ can be expressed by the ratio of the total pore volume Vp divided by the total volume of the sample Vt, $$\phi = \frac{Vp}{Vt}.$$

According to the invention, the porosity $\phi$ of the material used for layer 3 ranges between 1% and 50%, preferably between 5% and 35%. The porosity can be homogeneous, i.e. the size of the pores is substantially constant. The pore size can be small in relation to the dimensions of layer 3, for example the diameter of the pores is less than one tenth of the thickness e of layer 3. The pores can be evenly distributed in the material, i.e. the number of pores per unit of volume is substantially constant in the whole of layer 3.

The permeability of a material characterizes the ability of the material to be traversed by a fluid. A fluid can flow through a permeable material. The permeability can be expressed by Darcy's law for a fluid on linear flow and in the steady state: permeability k is the proportionality coefficient which relates the flow rate Q of a fluid of viscosity p passing through a material sample of section S and of length dl to the pressure drop dP required for passage of the fluid through the sample.

$$Q = k \frac{S.dP}{\mu.dl}$$

permeability k is expressed in Darcy (D).

According to the invention, k can range between 0.005 D and 5 D, preferably between 0.1 D and 1 D. These values of k are obtained using the fluid intended to be conveyed by the pipe according to the invention and at a temperature of 20° C.

The thickness e of layer 3 can be constant. According to the invention, thickness e can be in keeping with the thickness of the viscous layer of the flow. For example, thickness e is greater than the thickness of the viscous layer. The viscous layer is a notion that is well defined by the fluid mechanics theory. The viscous layer designates the layer of a fluid flowing in the vicinity of a wall. The flow of this viscous layer is of laminar type in contrast to the turbulent flow of the rest of the fluid. There is practically no turbulence in this viscous layer. The viscous layer may depend on the Reynolds number or, more precisely, on ratio $$\frac{V.\rho}{\mu}$$

where V is the velocity of the fluid, $\rho$ the density of the fluid and $\mu$ the absolute viscosity of the fluid. Table 1 gives the range of values of thickness e as a function of the Reynolds number for a tube whose inside diameter is 1 m.

TABLE 1

| Reynolds number | Thickness e in mm |
| --- | --- |
| $10^4$ | 10 < e < 100 |
| $10^5$ | 1 < e < 10 |
| $10^6$ | 0.1 < e < 1 |
| $10^7$ | 0.01 < e < 0.1 |

The upper value of thickness e is not decisive for the function of the porous and permeable material layer: thickness e can exceed the upper value given in Table 1 without affecting the pressure drop reduction due to this porous layer.

The inner wall of layer 3 can be structured, i.e. it is provided with grooves arranged in the direction of flow of the fluid so as to limit the pressure drops.

The material used for layer 3 can be an indeformable solid, for example a solvent-containing resin with special pigments. The material used for layer 3 can also be a deformable elastic solid, i.e. a solid that deforms under mechanical stresses and recovers its initial shape when the stresses stop. Thus, the geometry of layer 3 can deform so as to best suit the flow in order to limit pressure drops. In this case, the porosity and permeability characteristics defined above are valid for the solid in the initial state when it is not subjected to stresses.

The inner wall of layer 3 can be structured and deformable.

What is claimed is:

1. A method for decreasing pressure drops generated by a fluid flow in a tube, the method comprising the following stages:
   putting a layer of a porous material onto the inner surface of said tube impermeable to said fluid, characterized in that:
      said material is selected with a permeability such that said fluid circulates in said layer and in an inner space defined by said layer.

2. A method as claimed in claim 1, characterized in that at least one characteristic of said material layer is determined so as to reduce the pressure drops generated by the flow of said fluid in said pipe, said characteristics being the porosity of said material, the permeability of said material and the thickness of said layer.

3. A method as claimed in claim 2, characterized in that the porosity of said material ranges between 1% and 50%.

4. A method as claimed in claim 2, characterized in that the permeability of said material ranges between 0.005 D and 5 D.

5. A method as claimed in claim 2, characterized in that the thickness of said layer is determined according to the viscous layer of the fluid flow.

6. A pipe for conveying a fluid while limiting pressure drops, pipe comprising a tube impermeable to the fluid conveyed and a layer of a porous material covering the inner wall of said tube, characterized in that the permeability of said material is such that said fluid circulates in said layer and in an inner space defined by said layer.

7. A pipe as claimed in claim 6, characterized in that the porosity of said material ranges between 1% and 50%.

8. A pipe as claimed in claim 6, characterized in that the permeability of said material ranges between 0.005 D and 5 D.

9. A pipe as claimed in claim 6, characterized in that the thickness of said layer is greater than the thickness of the viscous layer generated by the fluid flow on said porous and permeable material.

10. A pipe as claimed in claim 6, characterized in that said layer of porous and permeable material comprises grooves arranged in the direction of flow of said fluid and/or characterized in that said layer of porous and permeable material is deformable.

11. A method as claimed in claim 1, wherein said fluid is natural gas.

12. A natural gas transportation system, including the pipe as claimed in claim 6.

13. A pipe as claimed in claim 6, characterized in that the porosity of said material ranges between 5% and 35%.

14. A pipe as claimed in claim 6, characterized in that the permeability of said material ranges between 0.1 D and 1 D.

15. A method as claimed in claim 2, characterized in that the porosity of said material ranges between 5% and 35%.

16. A method as claimed in claim 2, characterized in that the permeability of said material ranges between 0.1 D and 1 D.

17. A method for decreasing pressure drops generated by a fluid flow in a tube, comprising:
   providing a tube impermeable to the fluid, the tube having a layer of porous material on the inner surface of the tube, the porous material having a permeability allowing the fluid to circulate in the layer of porous material;
   flowing the fluid through an inner space defined by the layer of porous material; and
   circulating the fluid in the layer of porous material.

18. A method as claimed in claim 17, characterized in that at least one characteristic of said material layer is determined so as to reduce the pressure drops generated by the flow of said fluid in a said pipe, said characteristics being the porosity of of said material, the permeability of said material and the thickness of said layer.

19. A method as claimed in claim 18, characterized in that the porosity of said material ranges between 1% and 50%.

20. A method as claimed in claim 18, characterized in that the permeability of said material ranges between 0.005 D 5 D.

21. A method as claimed in claim 18, characterized in that the thickness of said layer is determined according to the viscous layer of the fluid flow.

22. A method as claimed in claim 17, wherein said fluid is natural gas.

23. A pipe as claimed in claim 17, characterized in that the porosity of said material ranges between 5% and 35%.

24. A pipe as claimed in claim 17, characterized in that the permeability of said material ranges between 0.1 D and 1 D.

* * * * *